US011118946B2

(12) United States Patent
Lemke

(10) Patent No.: US 11,118,946 B2
(45) Date of Patent: Sep. 14, 2021

(54) DEVICE FOR FAULT DETECTION AND/OR IDENTIFICATION OF AT LEAST ONE SENSOR DEVICE

(71) Applicant: MSA Europe GmbH, Jona (CH)

(72) Inventor: Andreas Lemke, Berlin (DE)

(73) Assignee: MSA Europe GmbH, Jona (CH)

(*) Notice: Subject to any disclaimer, the term of this patent is extended or adjusted under 35 U.S.C. 154(b) by 532 days.

(21) Appl. No.: 15/028,456

(22) PCT Filed: Nov. 7, 2014

(86) PCT No.: PCT/EP2014/074052
§ 371 (c)(1),
(2) Date: Apr. 11, 2016

(87) PCT Pub. No.: WO2015/071190
PCT Pub. Date: May 21, 2015

(65) Prior Publication Data
US 2016/0252374 A1 Sep. 1, 2016

(30) Foreign Application Priority Data
Nov. 12, 2013 (DE) .................. 10 2013 223 021.4

(51) Int. Cl.
*G01D 18/00* (2006.01)
(52) U.S. Cl.
CPC .................. *G01D 18/00* (2013.01)

(58) Field of Classification Search
CPC ........ G01D 18/00; A61B 6/586; G06T 3/4053
See application file for complete search history.

(56) References Cited

U.S. PATENT DOCUMENTS

| 4,489,590 A | 12/1984 | Hadden |
| 4,590,789 A | 5/1986 | Kunze |
| 5,103,409 A | 4/1992 | Shimizu et al. |
| 5,617,337 A | 4/1997 | Eidler et al. |
| 6,115,654 A * | 9/2000 | Eid .................. G01D 21/02 244/1 R |
| 6,356,857 B1 | 3/2002 | Qin et al. |
| 6,918,281 B2 | 7/2005 | Sussman et al. |
| 7,031,865 B2 * | 4/2006 | Bathurst ................ G01D 3/022 374/208 |
| 7,138,820 B2 * | 11/2006 | Goetting ............ G01R 31/3167 326/9 |
| 9,234,919 B2 * | 1/2016 | Mandic .............. G01R 19/0092 |
| 2004/0190592 A1 * | 9/2004 | Lojen .................... G01K 15/00 374/172 |
| 2008/0027342 A1 * | 1/2008 | Rouw ................. A61N 1/3704 600/513 |
| 2009/0128160 A1 | 5/2009 | Chiaburu et al. |
| 2011/0098956 A1 * | 4/2011 | Vennelakanti ......... G01D 18/00 702/85 |

(Continued)

Primary Examiner — Alexander Satanovsky
Assistant Examiner — Lynda Dinh
(74) Attorney, Agent, or Firm — The Webb Law Firm

(57) ABSTRACT

A device and a method for fault detection and/or identification of at least one sensor device is described, characterized by a measurement mechanism with at least one high-resolution, A/D converter device for recording at least one electrical signal (A, $I_{out}$) at one or more coupling points for the at least one sensor device.

8 Claims, 5 Drawing Sheets

(56) References Cited

U.S. PATENT DOCUMENTS

2012/0250781 A1\* 10/2012 Rud .................. H03M 1/20
  375/295
2013/0154862 A1\* 6/2013 Rud ................ H03M 1/181
  341/131

\* cited by examiner

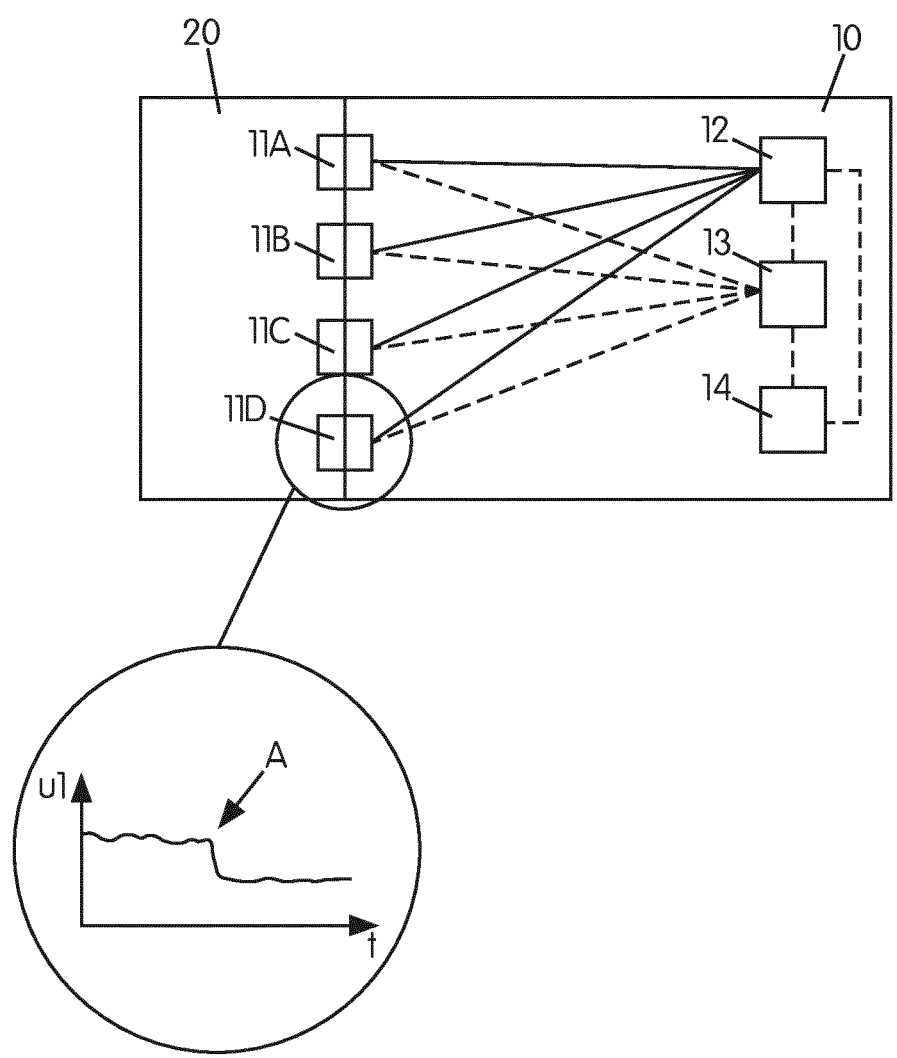

DEVICE FOR FAULT DETECTION AND/OR IDENTIFICATION OF AT LEAST ONE SENSOR DEVICE

CROSS-REFERENCE TO RELATED APPLICATIONS

This application is the United States national phase of International Application No. PCT/EP2014/074052 filed Nov. 7, 2014, and claims priority to German Patent Application No. 10 2013 223 021.4 filed Nov. 12, 2013, the disclosures of which are hereby incorporated in their entirety by reference.

BACKGROUND OF THE INVENTION

Field of the Invention

The subject matter described herein relates to fault detection and/or identification of at least one sensor device.

DESCRIPTION OF RELATED ART

In safety engineering, sensor equipment is used for example in the detection of toxic or explosive gases. It is quite usual that sensor equipment is operated with different sensor devices, also called measurement probes. The sensor equipment must be in a position to automatically recognize which sensor device is connected to the sensor equipment. Also, function and/or contact faults must be reliably detected. The electrical circuitry for this is very expensive. For that reason, a task is to create devices and methods which are simplified with respect to control engineering.

SUMMARY OF THE INVENTION

In summary, one aspect provides a device for fault detection and/or identification of at least one sensor device, characterized by a measurement means with at least one high-resolution, A/D converter device for recording at least one electrical signal at at least one coupling point for the at least one sensor device.

Another aspect provides a system, comprising: a coupling point for at least one sensor; and a measurement mechanism that measures a signal produced by a sensor connected to the coupling point; and a processor that identifies a characteristic of the sensor based on the signal.

A further aspect provides a method, comprising: recording at least one electrical signal for a sensor using a measuring device; and using the recorded at least one electrical signal to perform one or more of the following: identifying the sensor; and detecting a sensor fault.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE DRAWINGS

Embodiments are presented by way of example in the following figures. Shown are:

FIG. 1 is a schematic representation of an example embodiment of a device for fault detection and/or identification of at least one sensor device according to the principles of the present invention;

DETAILED DESCRIPTION OF THE INVENTION

Figure 2A:
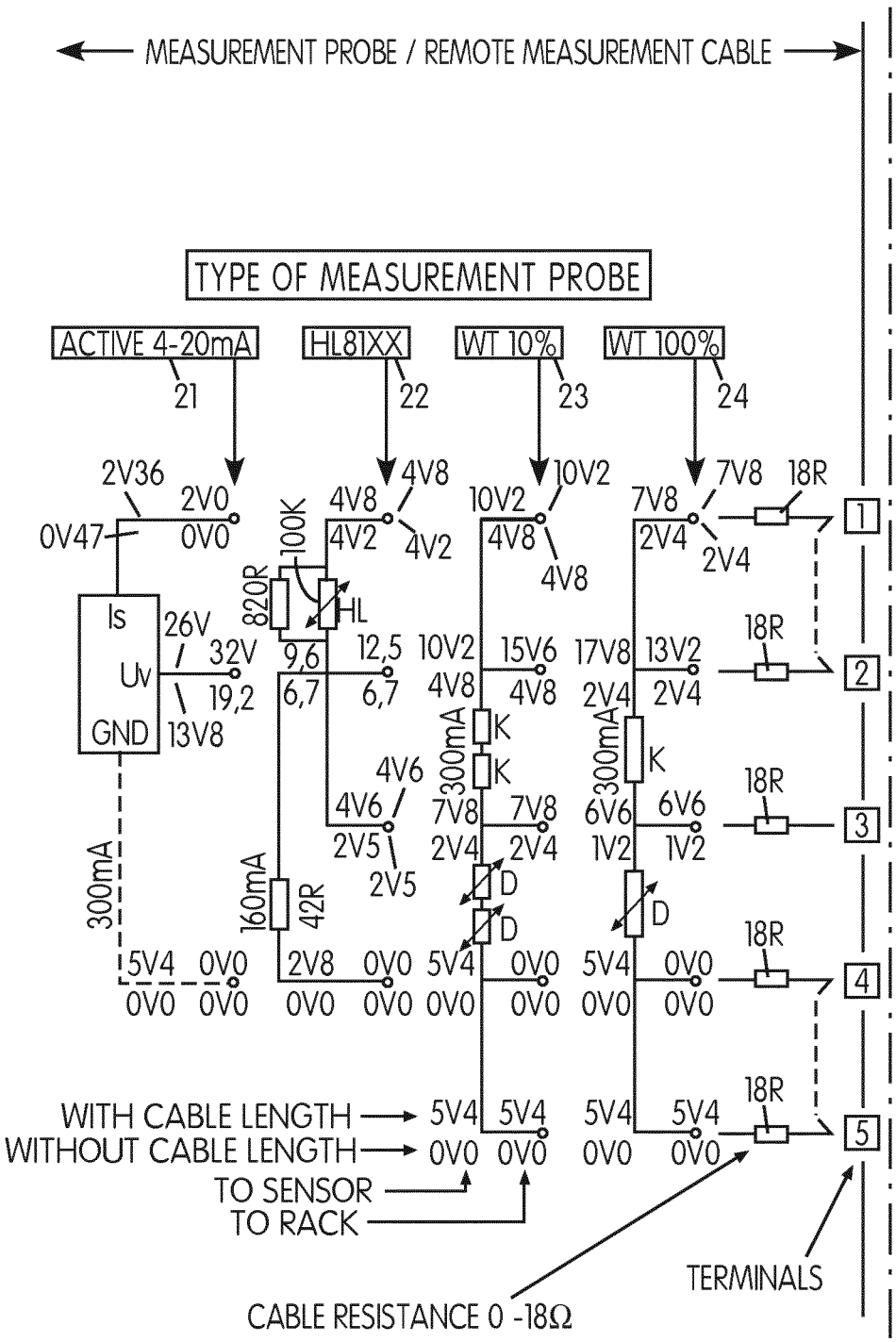
FIG. 2 is a basic circuit diagram for an example embodiment of a device for fault detection and/or identification of at least one sensor device according to the principles of the present invention.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

An embodiment-provides devices and methods which are-simplified-with-respect to control engineering.

In one embodiment, the device includes a means for measurement, such as a measurement device, a measurement apparatus, a measurement mechanism, a measurement arrangement, a sensor, and/or the like. This measurement device 10 includes a high-resolution, A/D converter device for recording at least one electrical signal at a coupling point for the at least one sensor device. Signal recording takes place in the A/D converter device, so expensive wiring for signal recording can be omitted. The use of a high-resolution, A/D converter also makes it possible, in particular, to record very small changes in voltage in the microvolt range, without amplification of the signals being necessary.

Using an embodiment it is possible to use sensor devices with different operating parameters and to evaluate its signals without specific circuitry being required for the respective sensor device (e.g., no measurement-signal amplification is required, no zero-point adjustment is required, no sensitivity adjustment is required, no isolated fault recognition is required, etc.). This leads to reduced space requirements and lower costs. Additionally, according to an embodiment, no software needs to be adapted to the respective sensor device. In an embodiment, the A/D converter device exhibits a resolution capacity of at least 16 bits, particularly 24 bits.

In an embodiment, a voltage signal or a current signal is the electrical signal recorded at the at least one coupling point. In an embodiment, a targeted electrical power supply produces an electrical signal profile that is at the at least one coupling point. The signal profile can be produced, for example, upon starting up the device, in order to determine what type the sensor device is.

The signal profile may exhibit, for instance, an incline, a step, a frequency-dependent component, and/or a portion of a sine signal. Using the response recorded by the A/D converter device, the type of sensor device can be inferred.

In an embodiment, the electrical signal recorded at the at least one coupling point by a data-processing device, by a microcontroller, is compared to a pre-set pattern, in which the at least one current supply can be controlled, depending on the comparison. If the pattern is recognized, a suitable supply of current can be ensured from the current supply. If the pattern is not recognized, another electrical signal profile can be produced, in order to recognize the type of the sensor device. In an embodiment, automatic recognition of the type of the at least one sensor device occurs based on the electrical signal recorded. For operating safety, an embodiment may automatically establish, e.g., upon system start-up or replacement of the sensor device, the upper and lower threshold values for an acceptance range.

An embodiment provides devices and methods which are simplified with respect to control engineering. The problem is also solved by a method including a high-resolution, A/D converter device, where at least one electrical signal is recorded at one or more coupling points for the at least one sensor device.

The illustrated example embodiments will be best understood by reference to the figures. The following description is intended only by way of example and simply illustrates certain example embodiments.

FIG. 1 schematically depicts the components of an embodiment of a device for the identification and/or detection of faults for a sensor device 20. The sensor device 20 here is coupled by four coupling points 11A, 11B, 11C, 11D to a measurement device 10. The coupling may, among other things, take place by way of an assembly, so that the coupling points 11A, 11B, 11C, 11D include terminals. In alternative embodiments, more or fewer coupling points than the four of 11A, 11B, 11C, 11D illustrated in the example of FIG. 1 may be used.

Electrical signals A are at the coupling points 11A, 11B, 11C, 11D (see insert in FIG. 1). There may be similar or different voltage or current signals, which can be recorded by the measurement device 10. The measurement device 10 exhibits, in the embodiment depicted, a high-resolution, A/D converter device 13, a current supply 12, and a data-processing device 14.

The high-resolution, A/D converter device 13 may for example include a resolution of 24 bits. Alternatively, A/D converters of another construction type can also be used. The A/D converter device 13 serves to record and convert the measured values that are recorded by the sensor device 20.

With the high-resolution, A/D converter device 13, in the embodiment depicted in FIG. 1, the voltages at the coupling points 11A, 11B, 11C, 11D are measured (illustrated as dashed data-cables in FIG. 1 between the A/D converter device 13 and the coupling points 11A, 11B, 11C, 11D). In normal operation, for passive sensor devices 22, 23, 24, for instance, each voltage is 15 V maximum. In the event of a fault, it may be up to 40 V.

The high-resolution, A/D converter device 13 is used not just to record the measured values proper, but also to evaluate the electrical signals A that are present and measured at the coupling points 11A, 11B, 11C, 11D. The type of sensor device 20 and/or a fault in the sensor device 20 (e.g., cable short-circuit, cable break, etc.) can be recognized therewith, which are only illustrated as non-limiting examples in the context of FIGS. 2 and 3. By using the high-resolution, A/D converter device 13, expensive circuitry with four structural elements is avoided.

The current supply 12 controlled by the data-processing device 14 supplies between 50 and 450 mA or a constant voltage between 22 and 28 V, depending on the type of sensor device 20 (illustrated using solid lines in the example of FIG. 1). The values may vary, e.g., depending on the sensor device 20 connected, because the sensor device 20 responds differently to the voltages and currents present.

Basically, the current supply 12 is fed from up to three different sources, namely an external voltage source, an internal voltage source, and/or a battery. Controlled by the microcontroller of the data-processing device 14, the current supply can fulfill a number of functions.

Thus, for instance, the type of sensor device 20 (i.e., of the measurement probe) can be determined. For this, the voltage supply or the current supply and the terminal wiring are controlled during the startup phase or during the replacement of the sensor device 20 at the measurement means 10 in a suitable manner, so that, using the voltage and current parameters tuned to the coupling points 11A, 11B, 11C, 11D, the type of sensor device 21, 22, 23, 24 can be recognized.

Figure 2B:
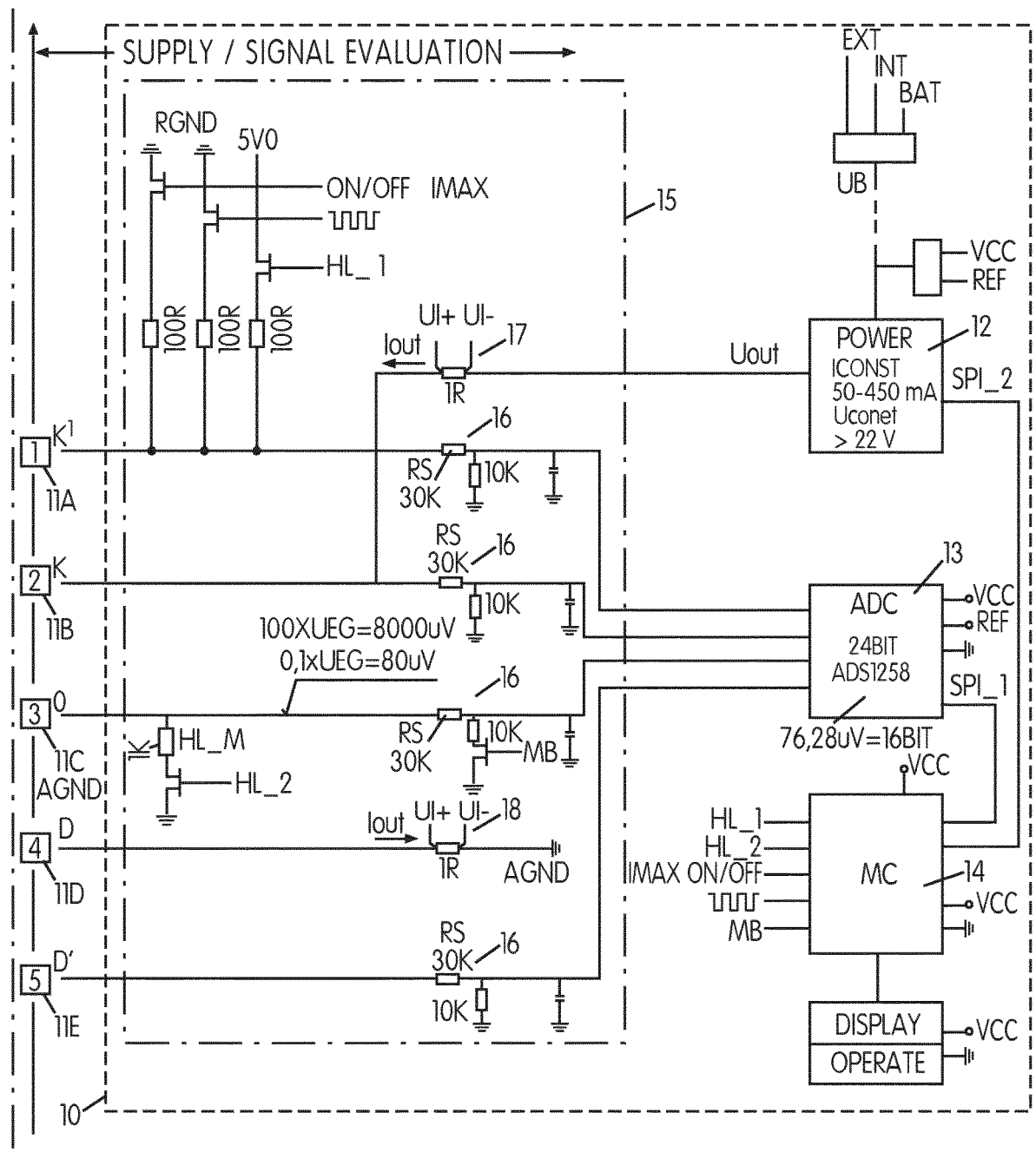

FIG. 2 depicts a basic circuit diagram of a further embodiment. An A/D converter device 13 is illustrated (in the example illustrated in FIG. 2 the A/D converter is a Texas Instruments ADS 1258 with 24-bit resolution capacity), which is coupled to a current supply 12 and a data-processing device 14. These units are part of a measurement device 10, which in FIG. 2 is enclosed by a dashed line.

The interface for the sensor devices 21, 22, 23, 24 to be measured is formed by the coupling points 11A, 11B, 11C, 11D, 11E, i.e., there are five terminals in the example illustrated in FIG. 2. The first sensor device 21 is an active sensor device; the second, third, and fourth sensor devices are passive sensor devices 22, 23, 24.

Furthermore, just one tuning circuit 15 is disposed in the measurement device 10 (enclosed in FIG. 2 by a dot-dash line). Electrical signals A read in at the coupling points 11A, 11B, 11C, 11D, 11E for processing. Thus, the leads from the first, second, third, and fifth coupling points 11A, 11B, 11C, 11E, respectively, are connected to the A/D converter device 13. The fourth coupling point 11D is connected to ground. In normal operation, voltages up to 15 V are at the four coupling points 11A, 11B, 11C, 11E (e.g., for passive sensor devices 22, 23, 24). The voltage ranges relevant here for the acceptance case are the voltage values that are measured at a rack, which is depicted in FIG. 2.

So, for the four coupling points 11A, 11B, 11C, 11E of the third sensor device 23, the following acceptance ranges can be indicated: 4.0-10.2 V (first coupling point 11A), 4.8-15.5 V (second coupling point 11B), 2.4-7.8 V (third coupling point 11C), and 0.0-5.4 V (fifth coupling point 11E).

For the fourth sensor device 24, they are: 2.4-7.8 V (first coupling point 11A), 2.4-13.2 V (second coupling point 11B), 1.2-6.6 V (third coupling point 11C), 0.0-5.4 V (fifth coupling point 11E).

Figure 4:
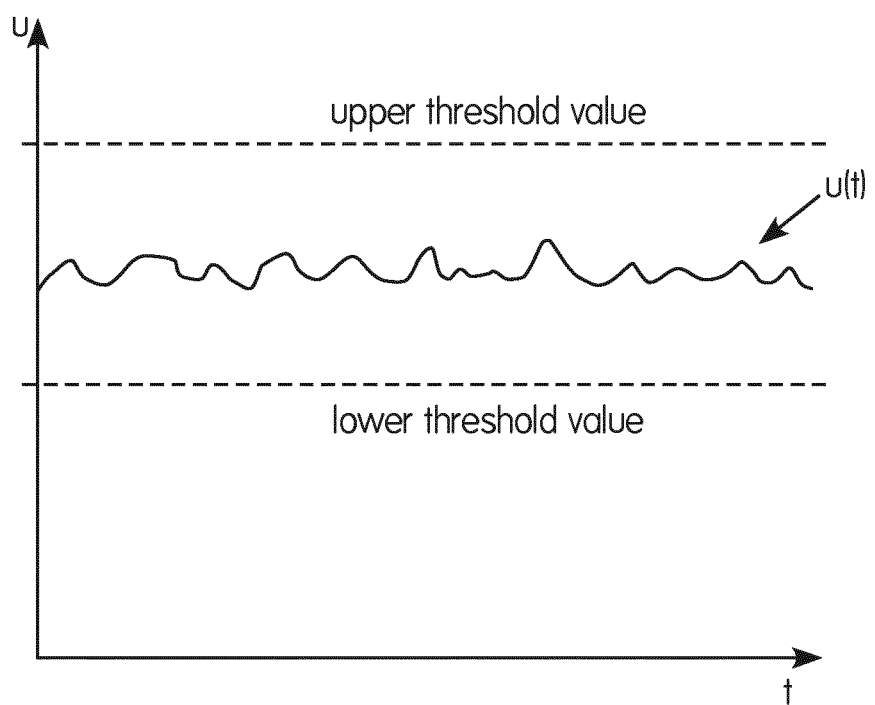
FIG. 4 is a representation of acceptance values and fault values according to the principles of the present invention.

Values outside these bands are considered to be faults, which is described in further detail in accordance with FIG. 4. In the case of a fault, voltages up to 40 V can occur.

The voltage values that are measured directly at coupling points 11A, 11B, 11C, 11E (i.e., at the rack, also designated as terminals in FIG. 2), also take into account the resistance of the cable lengths between coupling points 11A, 11B, 11C, 11E and the sensor means 21, 22, 23, 24. A short circuit or a line fault can, for instance, be inferred from a deviation from acceptance values. In FIG. 2, the nominal line resistance is given by 18 ohms.

Three of the four coupling points 11A, 11C, 11E joined to the A/D converter device 13 further each exhibit a 4:1 voltage divider 16, to which the measured voltages are tuned in the measurement range (1 to 5 V) of the A/D converter device 13. The series resistances (RS) of the voltage divider 16 operate in the case of faults or upon coupling of the voltage peak (EMV case) together with bleed-off diodes, which are arranged, in the A/D converter device 13, to limit the input current for the A/D converter device 13.

The cable of the third coupling point 11C is provided with a disconnectable current divider 16 in order to therewith be able to measure voltages directly in the μV range without loss of resolution.

At the five coupling points 11A, 11B, 11C 11D, 11E, different sensor devices 21, 22, 23, 24 can be connected, which are depicted at the left in FIG. 2. These can each be coupled alternatively with the measurement device 10. The function of the different sensor devices is described in the context of FIG. 3.

Figure 3:
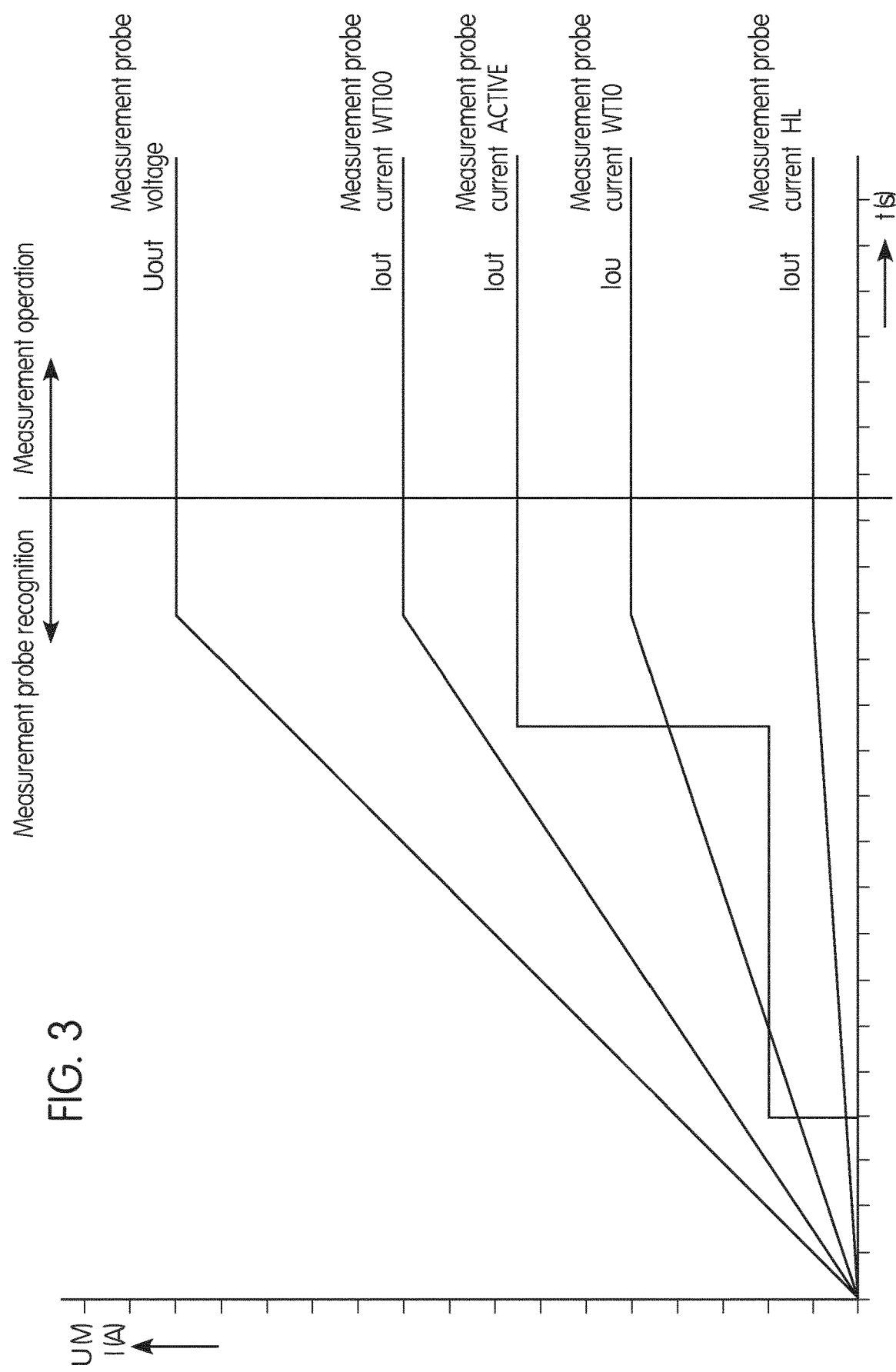
FIG. 3 is a representation of current and voltage signals for the recognition of sensor devices according to the principles of the present invention.

In FIG. 3, using the examples with reference to FIG. 2, it is depicted how recognition of different sensor devices 21, 22, 23, 24 takes place. For this, measured electrical signals (designated in FIG. 1 by "A") are evaluated.

A voltage $U_{out}$ is controlled by a data-processing device 14 and is applied from the current supply 12 to the second coupling point 11B. The voltage $U_{out}$ is a time-dependent signal, which first travels on an incline and is then converted to a constant voltage. Alternatively, other signal profiles can be used for the voltage $U_{out}$, such as, for example, a step and/or sine component. A current signal can also be used as a signal profile.

In FIG. 3, four different current signals $I_{out}$, are depicted, which, depending on the type of sensor device 21, 22, 23, 24, result as functions of the $U_{out}$ signal.

The first sensor device 21 is designated ACTIVE, 4-20 mA. Different sensor elements can be operated with this first sensor device 21. The first sensor device 21 exhibits, besides a sensor element, an electronic module that supplies the sensor element and converts the measured value to a 4-20 mA constant-current signal, which is evaluated by the first coupling point 11A of the AD converter device 13. The current supply results with a constant voltage through the second coupling point 11B.

The $I_{out}$ signal of the first sensor device exhibits two transient responses, which is characteristic of this type of sensor device 21, namely an active sensor device 21. The current flow here is not proportional to the voltage signal $U_{out}$. Rather, first there is a specified current signal from specified threshold values. The second sensor device 22 is designated as HL81XX. Toxic gases such as, for example, carbon monoxide or hydrogen sulfide, or explosive gases, can be detected with this type of sensor device.

The second sensor device 22 is supplied with a constant current through the second coupling point 11B. The sensor element HL (an active resistance reacting to gas) is brought to operating temperature by the current supply. Gases that arrive at the sensor element HL reduce the resistance of sensor element HL. This leads, at the third coupling point 11C, to a rise in voltage at the resistance HL_M in the tuning circuit 15, which is evaluated by the A/D converter device 13.

The recorded $I_{out}$ signal of the second sensor device 22 exhibits a definitely flat slope and a very low end value.

The third sensor device 23 is designated as WT10. What is more, it involves a measurement probe for the detection of combustible gases (e.g., methane, hydrogen, ethylene, etc.) with a measurement range of 10% of the lower explosive limit (LEL). The third sensor device 23 is supplied with constant current through the second coupling point 11B. The sensor elements D and K (two each controlled resistances in series) are thereby heated up. Combustible gases that arrive at the active sensor element D are oxidized there, which leads to a temperature increase in sensor element D. This in turn leads to an increase in the resistance at the sensor element D. The voltage increase resulting there-from at sensor element D is plotted as a measured signal by the third coupling point 11C and is evaluated by the A/D converter device 13.

The signal path of $I_{out}$ at the third sensor device 23 is analogous to the signal $U_{out}$. First, an incline-shaped rise results. As soon as $U_{out}$ is constant, $I_{out}$ is also constant.

The sensor elements, K, are inactive in the embodiment depicted for the third sensor device. Basically, this serves to compensate for the effects of humidity and outside temperature. No oxidation of combustible gases takes place.

The fourth sensor device 24 is designated as WT100. Functionally, it is identical to the third sensor device 23, so that the above description of the third sensor device 23 is applicable. In contrast to the third sensor device 23, it has a measurement range of 100% LEL. The wiring with the sensor elements D and K is also somewhat different.

It can be seen in FIG. 3 that the path of the $I_{out}$ signal of the fourth sensor device 24 is similar to that for the third sensor device 23. To be sure, the increase in slope is greater and the end value of $I_{out}$ is larger. Using these differences, the two sensor devices 23, 24 may differ for combustible gases.

Using the four different sensor devices 21, 22, 23, 24, it is made clear that these all respond differently to a $U_{out}$ signal. The data-processing device 14 can automatically recognize sensor device type using the $I_{out}$ signals recorded, without expensive wiring being required.

Fault recognition in the sensor devices 21, 22, 23, 24 is also possible by means of electrical signals recorded at the coupling points 11A, 11B, 11C, 11D, 11E. For this, the data-processing device 14 can receive, for example, signals $I_{out}$ and $I_{in}$ (not depicted in FIG. 3) at the second and fourth coupling points 11B, 11D, in which these are conducted by resistances 17, 18, so that a voltage signal can be measured. This then allows for conclusions regarding faults.

Furthermore, FIG. 3 shows that there is a shift, as of a specified time after settling down to a steady state, from sensor-device recognition to the operation of measuring.

Also, used with this function is the high-resolution, A/D converter device 12, which can operate directly with the signals recorded and requires no additional electronic circuitry for signal processing.

In FIG. 4 depicts schematically how an acceptance state is defined at the coupling points 11A, 11B, 11C, 11D, 11E. During the total relevant time, the voltage signals must move within a specified band. Falling below or exceeding a threshold value is evaluated as a fault. The relevant threshold values for the embodiment depicted here are indicated in FIG. 2 as the voltage values that are measured at the rack.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A measurement device comprising:
   at least one coupling point for connecting to at least one sensor device;
   at least one A/D converter configured to:
      measure and record at least one electrical signal profile at the at least one coupling point for the at least one sensor device when the at least one sensor device is connected to the at least one coupling point and when the measurement device is started up, wherein the at least one electrical signal profile recorded for the at least one sensor device is based on an electrical signal measured at the at least one coupling point when the at least one sensor device is connected to the at least one coupling point, wherein the electrical signal measured at the at least one coupling point when the at least one sensor device is connected to the at least one coupling point is based on a voltage or a current produced by the at least one sensor device;
   an electrical power supply configured to:
      provide a targeted electrical signal profile to the at least one sensor device when the at least one sensor device is connected to the at least one coupling point and when the measurement device is started up, wherein the at least one electrical signal profile recorded at the at least one coupling point for the at least one sensor device is a signal profile based on a voltage or a current produced by the at least one sensor device when the at least one sensor device is connected to the at least one coupling point in response to the targeted electrical signal profile provided to the at least one sensor device by the electrical power supply, wherein the targeted electrical signal profile is based on a predetermined signal profile which is determined to match the at least one electrical signal profile recorded at the at least one coupling point for the at least one sensor device; and
   a data-processing device configured to:
      compare the at least one electrical signal profile recorded at the at least one coupling point to at least one of a plurality of predetermined signal profiles, wherein the plurality of predetermined signal profiles are based on a plurality of pre-set signal profile patterns;
      determine which of the plurality of predetermined signal profiles matches the at least one electrical signal profile recorded at the at least one coupling point;
      automatically identify a type of the at least one sensor device based on the at least one electrical signal profile recorded at the at least one coupling point and the matching predetermined signal profile;
      automatically establish, at a predetermined time, upper and lower threshold values for a range of signal values for the at least one sensor device, wherein, when automatically establishing the upper and lower threshold values for the range of signal values, the data processing device is configured to:
         determine the range of signal values at system start-up or sensor device replacement based on the type of the at least one sensor device;
      control the electrical signal power supply based on the type of the at least one sensor device;
      determine whether the signal produced by the at least one sensor device connected to the at least one coupling point is outside the range of signal values; and
      indicate an existence of a sensor device fault condition of the at least one sensor device based on determining that the signal produced by the at least one sensor device is outside the range of signal values.

2. The device according to claim 1, wherein the at least one A/D converter exhibits a resolution capacity of at least 16 bits.

3. The device according to claim 1, wherein the targeted electrical signal profile exhibits at least one of the following: an incline, a step, a frequency-dependent component, a portion of a sine signal, or any combination thereof.

4. A method comprising:
   providing, by an electrical power supply, a targeted electrical signal profile to at least one sensor device when the at least one sensor device is connected to at least one coupling point of a measurement device;
   recording, by an A/D converter, at least one electrical signal profile at the at least one coupling point for the at least one sensor device when the at least one sensor device is connected to the at least one coupling point of the measurement device and the measurement device is started up, wherein the at least one electrical signal profile recorded is based on an electrical signal measured at the at least one coupling point when the at least one sensor device is connected to the at least one coupling point, wherein the at least one electrical signal profile recorded at the at least one coupling point for the at least one sensor device is a signal profile based on a voltage or a current produced by the at least one sensor device when the at least one sensor device is connected to the at least one coupling point;
   comparing, by a data-processing device, the at least one signal profile recorded at the at least one coupling point to at least one of a plurality of predetermined signal profiles, wherein the plurality of predetermined signal profiles are based on a plurality of pre-set signal profile patterns;
   determining, by the data processing device, which of the plurality of predetermined signal profiles matches the at least one electrical signal profile recorded at the at least one coupling point; and
   automatically identifying, by the data-processing device, a type of the at least one sensor device based on the at least one electrical signal profile recorded at the at least one coupling point and the matching predetermined signal profile;
   automatically establishing, by the data-processing device, at a predetermined time, upper and lower threshold values for a range of signal values for the at least one sensor device based on the type of the at least one sensor device, wherein automatically establishing the upper and lower threshold values for the range of signal values comprises:
  determining, by the data processing device, the range of signal values at system start-up or sensor device replacement based on the type of the at least one sensor device:
determining, by the data processing device, whether the signal produced by the at least one sensor device connected to the coupling point is outside the range of signal values; and
indicating, by the data processing device, an existence of a sensor device fault condition of the at least one sensor device based on determining that the signal produced by the at least one sensor device is outside the range of signal values.

5. A system comprising:
a coupling point for connecting to at least one sensor;
at least one A/D converter to measure and record a signal produced by the at least one sensor connected to the coupling point;
a processor to identify a characteristic of the at least one sensor based on the signal recorded by the at least one A/D converter, wherein the characteristic is selected from the group including an identification of a type of sensor of the at least one sensor and a sensor fault condition of the at least one sensor; and
an electrical power supply that provides a targeted electrical signal profile to the at least one sensor at the at least one coupling point,
wherein the processor is further configured to:
  automatically identify a type of the at least one sensor based on the signal produced by the at least one sensor when the at least one sensor is connected to the at least one coupling point by comparing the signal to a plurality of predetermined signal profiles, wherein the plurality of predetermined signal profiles are based on a plurality of preset signal patterns pattern;
  automatically establish, at a predetermined time, upper and lower threshold values for a range of signal values for the at least one sensor, wherein, when automatically establishing the upper and lower threshold values for the range of signal values, the processor is programmed or configured to:
  determine the range of signal values at system start-up or sensor replacement based on the type of the at least one sensor;
  determine whether the signal produced by the at least one sensor connected to the coupling point is outside the range of signal values; and
  indicate an existence of the sensor fault condition of the at least one sensor based on determining that the signal produced by the at least one sensor connected to the coupling point is outside the range of signal values.

6. The system of claim 5, wherein the A/D converter has a resolution capacity of at least 16 bits.

7. The system of claim 5, wherein the signal is at least one of a voltage signal and a current signal.

8. The system of claim 5, wherein the preset signal pattern is at least one of the following: an incline, a step, a frequency-dependent component, a portion of a sine signal, or any combination thereof.

* * * * *